United States Patent [19]
Eadline

[11] Patent Number: 5,471,622
[45] Date of Patent: Nov. 28, 1995

[54] RUN-TIME SYSTEM HAVING NODES FOR IDENTIFYING PARALLEL TASKS IN A LOGIC PROGRAM AND SEARCHING FOR AVAILABLE NODES TO EXECUTE THE PARALLEL TASKS

[75] Inventor: Douglas J. Eadline, Bethlehem, Pa.

[73] Assignee: Paralogic, Inc., Bethlehem, Pa.

[21] Appl. No.: 425,712

[22] Filed: Apr. 20, 1995

Related U.S. Application Data

[63] Continuation of Ser. No. 268,158, Jun. 28, 1994, abandoned, which is a continuation of Ser. No. 73,964, Jun. 7, 1993, abandoned, which is a continuation of Ser. No. 417,203, Oct. 4, 1989, abandoned.

[51] Int. Cl.$^6$ .................................. G06F 9/44; G06F 9/00
[52] U.S. Cl. ..................... 395/650; 395/375; 364/230.3; 364/281; 364/DIG. 1; 364/975.5; 364/931.41
[58] Field of Search ...................................... 395/650, 375, 395/425, 600, 800

[56] References Cited

U.S. PATENT DOCUMENTS

| | | | |
|---|---|---|---|
| 3,614,745 | 10/1971 | Podvin et al. | 395/650 |
| 4,860,201 | 8/1989 | Stolfo et al. | 395/800 |
| 4,931,931 | 6/1990 | Syre et al. | 395/650 |
| 4,982,340 | 1/1991 | Oyanagi et al. | 395/63 |
| 5,053,950 | 10/1991 | Naganuma et al. | 395/650 |
| 5,159,686 | 10/1992 | Chastain et al. | 395/650 |

FOREIGN PATENT DOCUMENTS

| | | |
|---|---|---|
| 61-279938 | 12/1986 | Japan. |
| 61-279928 | 12/1986 | Japan. |

OTHER PUBLICATIONS

Ali, "Or–Parallel Execution of Prolog on a Multi–Sequential Machine," Int'l. J. Parallel Programming, vol. 15, No. 3, Jun. 1986, pp. 189–214.

Lee et al, "A Parallel Execution Model of Logic Programs on Tree–Structured Multiprocessor", 1985, pp. 65–72.

Cuadrado et al., "Prolog Goes To Work", Aug. 1985, pp. 151–158.

DeGroot, "Parallel Computation and Computers for Artificial Intelligence", 1988, pp. 91–107.

Hermenegildo, "An Abstract Machine for Restrictive AND–Parallel Execution of Logic Programs", pp. 25–39, 1986.

Hermenegildo et al., "Efficient Management of Backtracking in AND–Parallelism", pp. 40–54, 1986.

Knowles, "Parallel Processors Are Going Mainstream" Nov. 1, 1988, pp. 134–138.

Kowalski, "Logic Programming", Aug. 1985, pp. 161–176.

Pountain, "Parallelizing Prolog", Nov. 1988, pp. 387–394.

Li et al., "The Sync Model: A Parallel Execution Method for Logic Programming", IEEE, 1986, pp. 223–234.

*Primary Examiner*—Paul V. Kulik
*Assistant Examiner*—Paul Harrity
*Attorney, Agent, or Firm*—Reed Smith Shaw & McClay

[57] ABSTRACT

A system and method for parallel execution of logic programs on a computer network comprising two or more local-memory processors includes a logic program interpreter resident on all processors in the system. The interpreter commences execution of a logic program on one processor and, based on the results of its initial execution, generates lists of parallel-executable tasks and distributes them to other processors in the network to which it is coupled. Each processor which receives parallel tasks likewise commences execution, identification of parallel subtasks, and further distribution. When there are no parallel tasks at a processor or other processors available for further distributions, the task is executed sequentially and all execution results are returned to the processor which distributed the tasks executed.

19 Claims, 7 Drawing Sheets

RUN-TIME SYSTEM HAVING NODES FOR IDENTIFYING PARALLEL TASKS IN A LOGIC PROGRAM AND SEARCHING FOR AVAILABLE NODES TO EXECUTE THE PARALLEL TASKS

This is a continuation of application Ser. No. 08/268,158, filed on Jun. 28, 1994, now abandoned; which was a continuation of Ser. No. 08/073,964, filed Jun. 7, 1993, now abandoned; which was a continuation of Ser. No. 07/417,203, filed Oct. 4, 1989, now abandoned.

FIELD OF THE INVENTION

This invention relates to methods and apparatus for parallel computing, i.e., to computing in which a plurality of processors may operate simultaneously to solve a problem. More particularly, this invention relates to computer systems and methods for operating them to evaluate a problem to determine portions thereof which may be executed in parallel, and for distributing such portions among the processors present in the system.

BACKGROUND OF THE INVENTION

Computers in general use at present operate on the computational model developed by John von Neumann, in which a processor sequentially executes a list of instructions, one instruction at a time. Software in general use provides a means for a programmer to specify to the processor the instructions to be executed and their order of execution.

Unfortunately, there are physical constraints which limit the speed of a single von Neumann computing element. Predictions indicate that computer applications will require computational speeds greater than a single yon Neumann computing element can achieve.

In order to facilitate increased computational speed, parallel processing has been suggested. Networks of independent processors coupled by communication channels are commercially available. What is unavailable, however, is a suitable means for operating such networks to take advantage of the parallel processing which their structures permit. Conventional programming languages do not have the capability to control program execution on a plurality of processors, and there are limited methods for automatically converting existing programs written for conventional yon Neumann machines into a parallel-executable form.

Accordingly, languages or language extensions which contain the necessary control mechanisms might be developed to permit programs to be developed for parallel execution on multiprocessor systems. However, this solution has serious drawbacks. In particular, the programmer will be required to make assumptions as to the nature and number of computing elements in and topology of the network for which the programs are to be used. Such programs developed for one network would likely have to be substantially or entirely rewritten in order to run on other networks. Further, the speed increases obtained by such programs will be strongly determined by the skill of the programmer in selecting an algorithm and controlling the distribution of parallel components of the problem to be solved. While it may be possible for the programmer to adequately control the distribution and execution of a program for a network with a small number of processors, such control is likely to be intractable for large networks. Networks containing 1000 processors can be constructed from commercially available circuit boards, but it is unlikely that a programmer could adequately control execution of a program to take advantage of the processing capabilities of such a network. Finally, the speed of execution of the parallel components of programs will often be dependent on the data on which the programs operate. Since this cannot be determined in advance of execution of a program, in such circumstances it is impossible to optimize an algorithm for execution speed.

Programming languages have been developed which are largely machine-independent because they do not require control of the sequence of instruction execution. Such languages include logic programming languages, in which the problem is represented in the program as a set of logical facts and rules, in contrast with the lists of von Neumann procedures of conventional languages.

Others have proposed or developed logic program languages for use in multiprocessor networks. Commercially available parallel logic programs, however, have certain drawbacks. For instance, CS-Prolog requires the programmer to control the distribution of parallel portions of a program. Parsytec Prolog is similar in this respect, requiring the programmer to determine which portions of a program will be evaluated in parallel.

Another problem with the proposed and developed parallel processing methods is that they include compilation. Compiling has traditionally been used to maximize program execution speed, and accordingly the practice and suggestion of the prior art is to compile in the parallel processing context. Others have suggested parallel processing systems in which a logic program is extensively analyzed during compilation to determine all possible parallel execution paths. However, such an approach is based on the assumption that there will usually be more processors than parallel tasks, and therefore that the "overhead" execution time spent in identification of parallelism will be well spent. The assumption is believed by the inventor to be unwarranted, and that to the contrary, most problems will have sufficient parallelism to quickly saturate most networks. Accordingly, to optimize program execution speed, what is required is control of program execution to automatically operate the multiprocessor network at maximum efficiency for the particular program being executed and the particular network on which it is being executed.

SUMMARY OF THE INVENTION

It is therefore a general object of the invention to provide a method and apparatus ("system") for efficiently executing programs on multiprocessor computer networks.

It is an object of the invention to provide such a system which does not require control of the network by the programmer.

It is an object of the invention to provide such a system in which a program may operate on a multiprocessor network regardless of the network topology.

It is an object of the invention to provide such a system in which a program may operate on a multiprocessor network regardless of the number of processors in the network.

It is an object of the invention to provide such a system in which program execution is load-balanced, i.e. all processors in the network are substantially equally and substantially always busy during program execution.

It is another object of the invention to provide such a system in which parallelization overhead, i.e. the time devoted to identifying and distributing parallel portions of a program, is minimized.

It is another object of the invention to provide such a system which is operable with programs written in conventional logic programming languages, without modification of such programs.

It is another object of the invention to provide such a system in which the identification and distribution of parallel program components occurs automatically.

It is another object of the invention to provide such a system in which program execution is scalable, i.e., in which execution speed may be increased by increasing the number of processors in the network.

It is another object of the invention to provide such a system in which program execution is scalable even with very large numbers of processors.

It is another object of the invention to provide such a system in which different user programs may be executed simultaneously.

In accordance with the invention, a multiple processor computer network is provided which comprises two or more nodes, each of which includes a processor and its own local memory, i.e. memory which is not shared by any other processor in the network, and each of which is coupled to at least one other node in the network by a communication channel or communication link. The processors in the network are multiple instruction multiple data processors, i.e. processors which can execute different instruction sets and can use different data sets.

In accordance with the invention, a multiple processor network is provided in which each node is provided with a resident logic program interpreter implementing the method of the invention and with a copy of a user's logic program. In the method of the invention, execution of the user program commences on a processor in the network, which is the "root" processor for that program. The root processor identifies parallel portions of the program (also referred to as parallel "tasks" or "jobs") based upon the results of its initial execution, and distributes them to processors to which it is coupled until it has distributed all parallel tasks identified or until there are no coupled processors available to receive parallel tasks. Each processors which has received a parallel task likewise commences execution of the task received, identification of parallel sub-tasks therein, and distribution of the parallel tasks until it has distributed all parallel portions it has identified or until there are no coupled processors available to receive parallel portions. In either event, each processor which has received a parallel task executes it and returns the result of its execution to the processor which transmitted the parallel task to it. Accordingly, each processor accumulates the results of execution of the tasks it has received, and the solution of the user's program is accumulated on the root processor.

By distributing parallel tasks upon identification of them during execution of the program, the system of the invention achieves rapid saturation of the particular network in use with the particular user program, thereby automatically optimizing execution in such circumstances.

Further in accordance with the invention, the system includes certain novel restriction means to avoid errors and/or excessive time spent in identification of parallelism where execution indicates such may occur.

These and other objects and features of the invention will be understood with reference to the following specification, claims, and the drawings.

DETAILED DESCRIPTION OF THE PREFERRED EMBODIMENT

Figure 1:
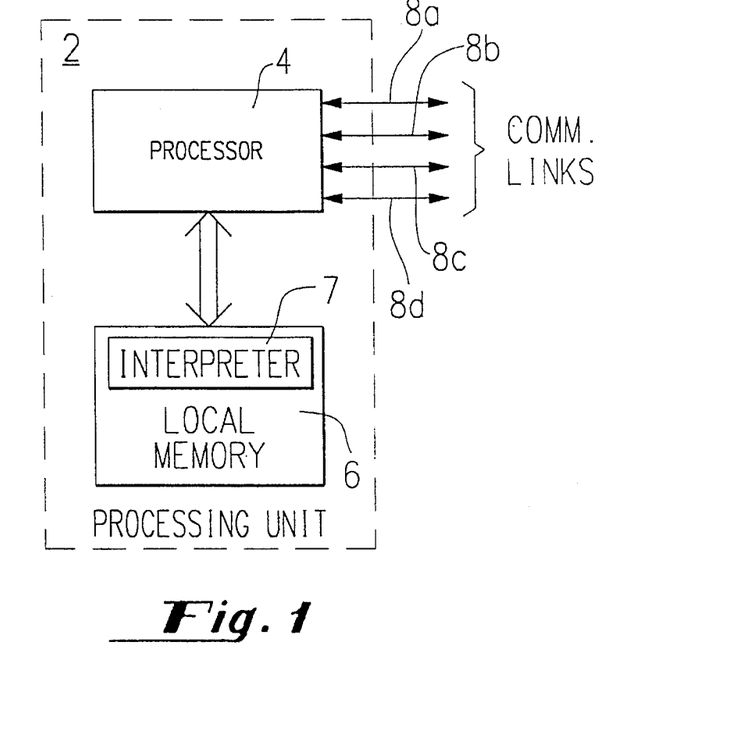
FIG. 1 is a block diagram of a processing unit useful in the present invention.

FIG. 1 shows a block diagram of a processing unit for use in the system of the present invention. Such processing units will, when interconnected, form a multiple processor network in accordance with this invention. Processing unit 2 includes processor 4 which is coupled to local memory means 6. Local memory means 6 may be accessed only by the processor 4 in the same processing unit. A plurality of communication links are provided to enable data interchange between the processing unit and other devices, such as other processing units or user input/output devices. FIG. 1 shows four such communication links, 8a, 8b, 8c, and 8d, which may be serial communication channels. Processors and computers which may be used in the present invention include the INMOS Transputer, the Intel Hypercube, and the N-Cube TEN, for instance.

Figure 2:
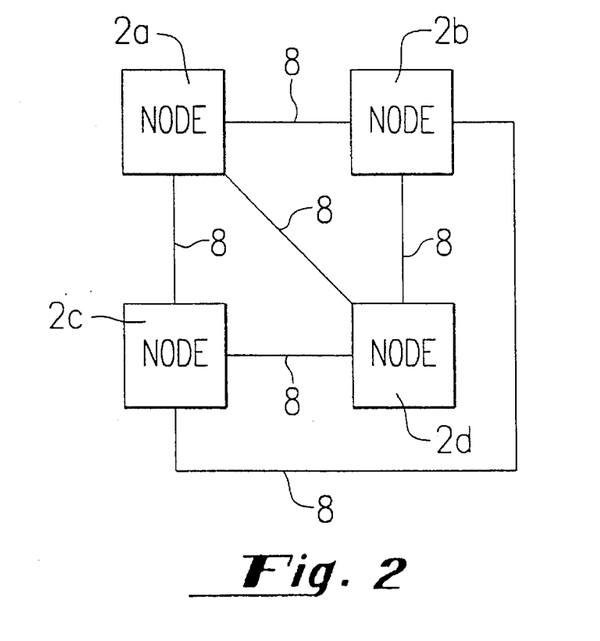
FIG. 2 is a block diagram of a multiple processor network useful in the present invention.

FIG. 2 shows a multiple processor network which may be constructed in accordance with the present invention. This network includes four nodes, 2a, 2b, 2c, and 2d, each of which has the structure described above with respect to FIG. 1. Each node is coupled to at least one other node by a communication link 8. The processors comprising the network need not be identical nor even operating synchronously or at the same speed. Not shown in FIG. 2 is a means for interchanging data with a user. While four nodes are shown in the network of FIG. 2, it will be understood that the multiple processor networks useful in the present invention may include an arbitrarily large number of nodes and may be interconnected in a large number of different ways.

Overall, the method of the invention involves the search for, distribution, and execution by a multiple processor network of parallel tasks within a logic program. The method is preferably implemented as a logic programming language interpreter 7 resident on each processing unit 2 of a multiple processor network. PROLOG is a preferred language for use in connection with the invention. Each processor in the multiple processor network keeps a list of parallel tasks it has found as well as copy of the logic program.

Figure 3:
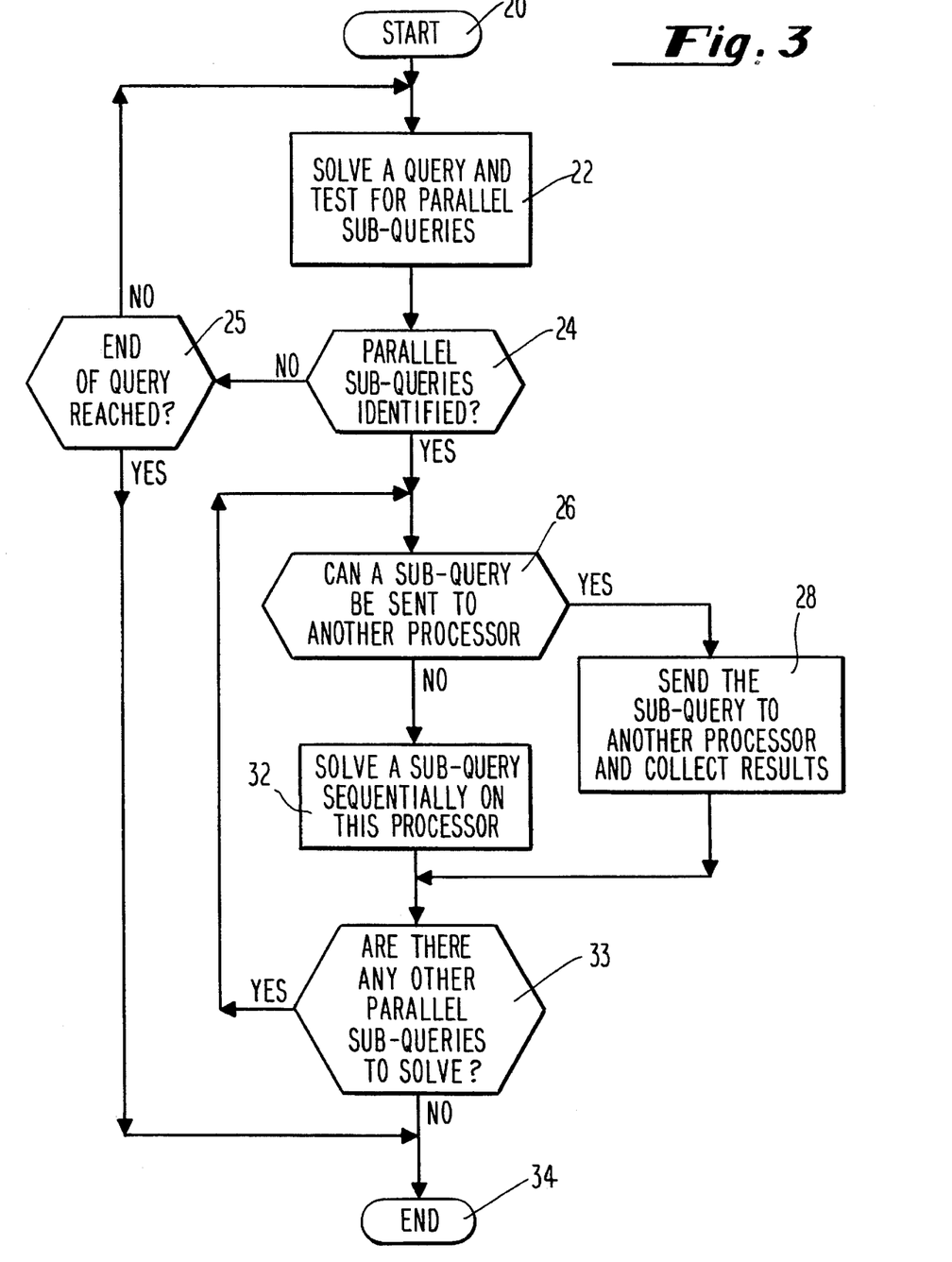
FIG. 3 is a flow chart illustrating the general features of the method of the present invention.

The general method of the invention is illustrated in FIG. 3. Execution begins in step 20 when a processor receives a query about the logic program. From solution of the initial query, in step 22, the processor will try to find parallel tasks in the form of sub-queries which may be sent to other processors. If no parallel sub-queries have been identified in step 24, the query is checked in step 25 to see if the end has been reached. If in step it is 25 determined that the query is finished, then the process concludes in step 34. Otherwise, if in step 25 it is determined that the query is not finished, the remaining query is evaluated again in step 22. If parallel sub-queries have been identified in step 24, in step 26 a check is made to determine if other processors are available to accept sub-queries. If none are available, in step 32 the query is solved sequentially by the processor. After or during the sequential solution of a sub-query the processor checks, in step 33, to see if there are any more sub-queries to be solved. If, however, in step 26 it is determined that other processors are available to accept sub-queries, then an identified sub-query is distributed in step 28 to one such processor and upon solution of the distributed query, results are returned to the processor which distributed them. After or during the remote solution of a sub-query the processor checks, in step 33, to see if there are any more sub-queries to be solved. If in step 33 it is determined that there are more sub-queries to be solved, either sequentially or on other remote processors, then the cycle is repeated using step 26. If in step 33 it is determined that there are no more sub-queries to be solved, the process concludes in step 34. Each processor in the network operates in accordance with the method of FIG. 3. The processor which receives a user's query is the root processor, which attempts to distribute parallel tasks it identifies as sub-queries to other processors. Each processor in turn will try to find further sub-queries to send to other processors. When a processor can find no other processor(s) to accept queries, the query is solved internally in a sequential fashion and the search for parallel queries is stopped. When a processor has found all the possible solutions to its initial query, either internally and/or from other processors, the results are sent back to the processor requesting the initial query. Eventually this process sends solutions back down the execution tree to the root processor and hence the user. Furthermore, after a processor sends its solutions back through the network, it is "pruned" from the tree and can immediately accept other parallel queries.

Accordingly, by use of interpretation and run-time control over identification and distribution of parallel tasks, the system of the invention operates to quickly distribute parallel tasks across the network and "saturate" it. When attempted identification and distribution of parallel tasks would be fruitless and time-consuming either because all parallel tasks have been identified and distributed or (more likely) at a given moment no processors are available to accept parallel tasks, the system of the invention determines that automatically, at run time, and locally in the network, and commences sequential solution of the program components where this situation obtains. Ultimately, each remaining program portion will be executed sequentially. However, even though the identification and distribution of parallel tasks takes place through an interpreter, this need not be and is desirably not the case for solution of identified parallel tasks. Such solution may desirably be accomplished via compiled subroutines for execution of the distributed logic program components. Thus, execution speed for parallel tasks need not be compromised by the use of an interpreter for identification and distribution of parallel tasks, and each function may be separately optimized for speed of program execution.

The list of parallel tasks identified by each processor is implemented as a data structure called the parallel stack. Any task identified that can be solved in parallel is placed on the parallel stack. The parallel stack is a "last in first out" data structure that is basically an organized list of parallel tasks. Every time a valid parallel process is found, it is placed on the parallel stack. Once all parallel tasks have been identified for a given clause or a task is identified that requires information from an unsolved task on the parallel stack, the parallel stack is "solved". Depending on the number of available processors, the solution of the parallel stack may involve remote network processors and the host processor, or both remote network processors and the host processor.

Because parallel tasks are distributed in the form of queries, an individual processor requires no knowledge as to the origin of a query to solve the query. The query could be from a user, in which case the processor is a root processor, or the query could be from another processor. Answers to the query are sent to the processor or user asking the query. This property allows multiple users to tap directly into the parallel network at the same time, provided each processor has access to each user's logic program. Since the allocation of processors is dynamic, multiple users and thus multiple execution trees can be active in the parallel network simultaneously.

The preferred mechanism for parallel interpretation of logic programs has two components. The first is a process mechanism that specifies the parallel tasks implied by the logic program. The second is an implementation mechanism that controls the distribution of parallel tasks over the network. These mechanisms are illustrated in and will be described with respect to FIGS. 4, 5, 6, and 7. It is believed by the inventor to be within the ordinary skill in the art to make and use, without undue experimentation, systems having the structure of FIGS. 1 and 2 and performing the functions set forth in FIGS. 3–7.

Figure 4:
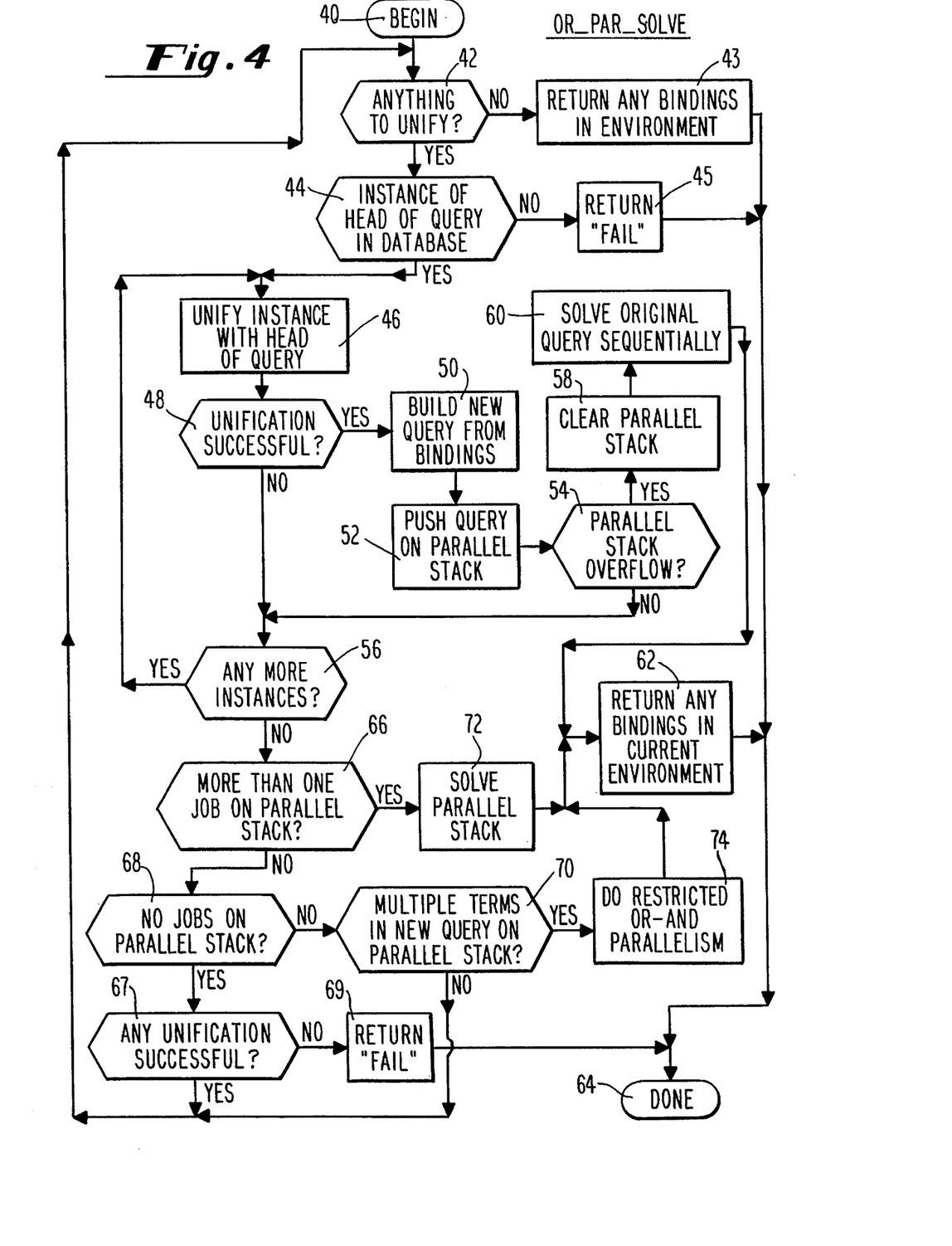
FIG. 4 is a flow chart illustrating one portion of the preferred method of the invention for specification of parallel tasks.
Figure 5:
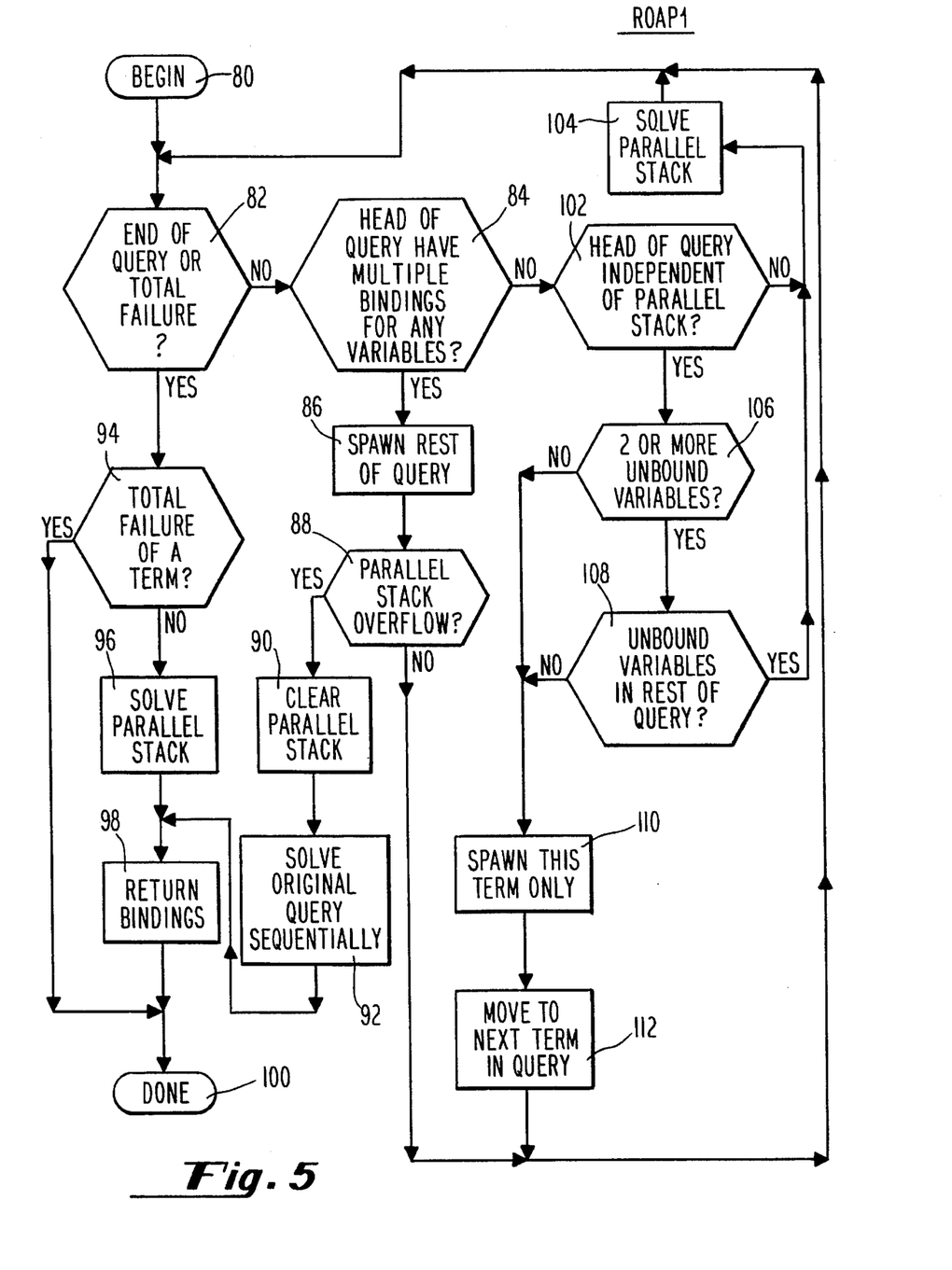
FIG. 5 is a flow chart illustrating a second portion of the preferred method of the invention for specification of parallel tasks.

The preferred process mechanism providing the functions in steps 22 and 24 of FIG. 3 is a restricted OR-AND parallel ("ROAP") process and is depicted in FIGS. 4 and 5. When the interpreter receives a query, the search for parallelism begins with the routine denominated herein as "OR_PAR_SOLVE" and depicted in and described with respect to FIG. 4.

In general, routine OR_PAR_SOLVE searches for OR parallel unifications for the head of the query. Once found, all successful OR parallel unifications are used to build a new query that is placed on the parallel stack. If this process produces more than one such task on the parallel stack, then the search for parallelism is stopped and the parallel stack is solved. If the unification produced only one new query on the parallel stack, then that query is checked for restricted OR-AND parallelism. If the new query on the parallel stack exhibits the potential for restricted OR-AND parallelism, then it is passed to subrouting ROAP1. Otherwise the new query cycles to the beginning of OR_PAR_SOLVE and the process repeats. Finally, if no new queries were produced by the unification or there was nothing to unify, the routine terminates directly.

The operation routine OR_PAR_SOLVE, as shown in FIG. 4, can be described as follows. The routine commences in step 40. Because the routine is recursive step 42 is a check to see if there are any more terms in the query to unify. If there are more terms to unify, then in step 44 a check is made to see if the head of the query can be matched to an instance in the database. If there are no terms to unify, then any bindings the routine has made will be returned in step 43. If no instance of the term can be found in the database, then in step 45 a "fail" message is returned.

If there is an instance of the head of the query in the database, then in step 46 unification begins with the first instance. If the unification is determined in step 48 to be successful then a new query is built in step 50 from any bindings made during the unification. Once the new query has been built, it is put on the parallel stack in step 52. If no parallel stack overflow is detected in step 54, step 56 will cause the routine to loop back to step 46 if there are further instances of the head of the query in the database. The process of unification, building new queries from bindings, and pushing the new queries on the parallel stack continues in a loop comprising steps 46, 48, 50, 52, and 56 for all instances in the database that match the head of the query.

An optional safeguard has also been included in step 54. Depending on a particular processor's available memory, a situation may occur where the parallel stack overflows. If this situation develops, as determined in step 54, the parallel stack is cleared in step 58 and the original query is solved sequentially in step 60. This process may seriously degrade performance, but the alternative is program termination due to the stack overflow. With this safeguard in place, the query will always be solved, although not necessarily in parallel.

When no more instances of the head of the query are found in the database in step 56, in step 66 a check is made to see if there is more than one job on the parallel stack. If there is more than one job on the parallel stack, then the parallel stack is solved in step 72. This is desirably accomplished by calling the subroutine SOLVE_PAR_STACK, the operation of which is depicted in and described hereinafter with regard to FIGS. 6a and 6b. If there is not more than one job on the parallel stack, a check is made in step 68 to see if there is at least one job on the parallel stack. If there is only one job on the parallel stack, then the query that comprises the job is checked in step 70 for multiple terms. The presence of multiple terms indicates that restricted OR-AND parallelism may be possible. If the query does have multiple terms, then in step 74 the query is removed from the parallel stack and checked for restricted OR-AND parallelism. This is desirably accomplished using a subroutine denominated herein as "ROAP1" and depicted in FIG. 5. If the single query on the parallel stack was not multi-termed, as determined in step 70, then the new single term query is cycled back to step 42 for evaluation by the OR_PAR_SOLVE process.

After steps 72 or 74 (subroutines SOLVE_PAR_STACK and ROAP1) or 60 (sequential solution of the original query) are completed, any bindings in the current environment are returned to the processor or user asking the query in step 62 and the routine terminates in step 64. If in step 68 it is determined that there are no jobs placed on the parallel stack, then in step 67 a check is made to see if any of the unifications were successful. If in step 67 it is determined that there were successful unifications, then in step 42 there will be nothing to unify and the routine will terminate through steps 43 and 64. If in step 67 no successful unifications are found, then step 69 returns a "fail" message and the routine terminates in step 64.

The second part of the ROAP mechanism is the search for restricted OR-AND parallelism in multi-termed queries, as indicated in step 74 of FIG. 4. FIG. 5 illustrates an embodiment of this process, denominated ROAP1. In general, the subroutine ROAP1 examines from left to right each term in the multi-termed query. Each term is examined to see if any of the variables within the term correspond to any variables in terms previously placed on the parallel stack. If there is no conflict (i.e. there are no shared variables), then the current term is AND parallel and is placed on the parallel stack. If there is a conflict, then the parallel stack is solved in order to obtain the possible bindings for the shared variables. Once the parallel stack is solved for part of the query, the bindings are checked to see if multiple bindings were produced for any variables present in the rest of the query. If multiple bindings were produced, the remainder of the query is "spawned" i.e., new OR parallel queries are produced based on all possible combinations of the returned multiple bindings. After the OR parallel queries have been identified and placed on the parallel stack, the parallel stack is solved. If multiple bindings were not produced, the next term is evaluated in an AND parallel fashion. Also included in the ROAP1 mechanism is a check for a large number of unbound variables on the parallel stack. This check is used to control the possibility of runaway OR parallelism occurring. When the end of the query is reached, all remaining jobs on the parallel stack are solved and the subroutine returns to OR_PAR_SOLVE.

The operation of subroutine ROAP1, as shown in FIG. 5, is as follows. Upon entry in step 80, ROAP1 checks in step 82 for the end of the clause or a total failure of a query that was previously solved on the parallel stack. When the subroutine is first entered, step 82 will always produce a NO result. On other cycles through step 82, the clause is checked to see if all the terms have been processed and if any term in the clause has failed. Failure implies that a term placed on the parallel stack as a sub-query could not produce bindings or could not be verified. Since all terms of a clause must succeed (term 1 AND term 2 AND term 3 . . . ), failure of any one term will cause failure of the complete clause.

In step 84, a test is made for restricted OR parallelism. If multiple bindings are found for any variable in the head of the query, then in step 86 the rest of the query including the head is "spawned" for each possible combination of variables and the resulting OR parallel tasks are placed on the parallel stack. At this point, assuming that no parallel stack overflow is detected in step 88, the search for parallelism stops and normal flow returns to step 82. Since the remainder of the query has been spawned, step 82 detects the end of the query and produces a YES result.

If there has been a total failure of a term, step 94 causes the routine to terminate in step 100. Otherwise, the parallel stack is solved in step 96, desirably using the SOLVE_PAR_STACK routine of FIG. 6, bindings are returned in step 98, and the routine then terminates in step 100.

As with the OR_PAR_SOLVE routine, an overflow condition for the parallel stack may result. This situation is checked in step 88 and if true causes the parallel stack to be cleared in step 90 and the original clause to be solved sequentially in step 92. Again, this process may degrade performance, but the alternative is program termination.

If at step 84 there are no multiple bindings for the head of the query, control passes to step 102, in which a check is made to see if the variables in the current term are "independent" of all the jobs on the parallel stack. This test produces a YES if the current term can be placed on the parallel stack and a NO if the parallel stack must be solved before current term can be placed on the parallel stack. If in step 102 it is determined that the term is not independent (e.g. there are shared variables between the term and terms already on the parallel stack), then the parallel stack is solved in step 104 (desirably by routine SOLVE_PAR_STACK) and control is returned to step 82. On the other hand, if in step 102 it is determined that the term is independent, then control is passed to steps 106 and 108, which are used to restrict the possibility of runaway OR parallelism.

Restriction of possible OR parallelism is included to avoid possible situations where there may be multiple bindings returned for the variables in queries on the parallel stack. For example, assume there are three independent AND parallel jobs on the parallel stack that contain one variable each. If each of these variables produce 100 bindings and the next term in the query requires all combinations of all three variables, then the number of parallel tasks spawned will be 100×100×100= 1,000,000. Clearly, such a large amount of parallel tasks will require a prohibitively large amount of processor overhead and memory. Steps 106 and 108 place a limit on the possibility that such an exponential explosion of jobs will occur. Step 106 is a check to see if the number of unbound variables on all jobs on the parallel stack is equal to or greater than a predetermined number, such as two. The restriction to two variables is somewhat arbitrary and will in practice be based on specific hardware considerations. The important point is that there is a restriction step based on the number of unbound variables on the parallel stack.

If step 106 returns YES (it almost always will with two or more jobs on the parallel stack), then the remaining terms in the rest of the clause are checked in step 108 to see if they contain combinations of at least a predetermined number, such as two, of these variables. Again, the number two is somewhat arbitrary. If step 108 returns a YES, then the parallel stack is solved in step 104 and the current term is spawned on the next cycle through step 82. If in either step 106 or step 108 it is determined that the possibility of run away OR parallelism is not present, indicated by a NO, then the current term is spawned in step 110 and placed on the parallel stack. Although in some cases the foregoing restriction mechanism may result in the loss or postponement of parallelism, the possibility of too much parallelism could be equally as costly in terms of processing time and overhead. This restriction mechanism will also ensure that the parallel stack will not overflow in this cycle, thus no safeguard check similar to step 88 is likely to be necessary.

Only after flow is directed from either step 106 or 108 to the SPAWN function in step 110 is the next term in the query obtained in step 112. If no term car be obtained, then in step 82 the end of the query will be detected.

As mentioned, in step 82 a check is made for both the end of the query and for a total failure of any job that has been solved on the parallel stack. If there has been no total failure, as detected in step 94, then any jobs remaining on the parallel stack are solved in step 96. Finally, if there was no total failure, the bindings returned from solving the parallel stack are returned in step 98 to the calling routine, and subroutine ROAP1 terminates in step 100.

After the ROAP mechanism described above has placed a number of jobs on the parallel stack, the jobs must be distributed to other processors in the network for execution. The subroutine depicted in FIGS. 6a and 6b, referred to herein as "SOLVE_PAR_STACK", is the preferred method to perform this process. In general, subroutine SOLVE_PAR_STACK is a local allocation or "spawning network" method that does not require central control for distribution of parallel tasks. In simple form, local allocation requires a processor with parallel tasks to check the status of its "directly connected" nearest neighbors.

Figure 6A:
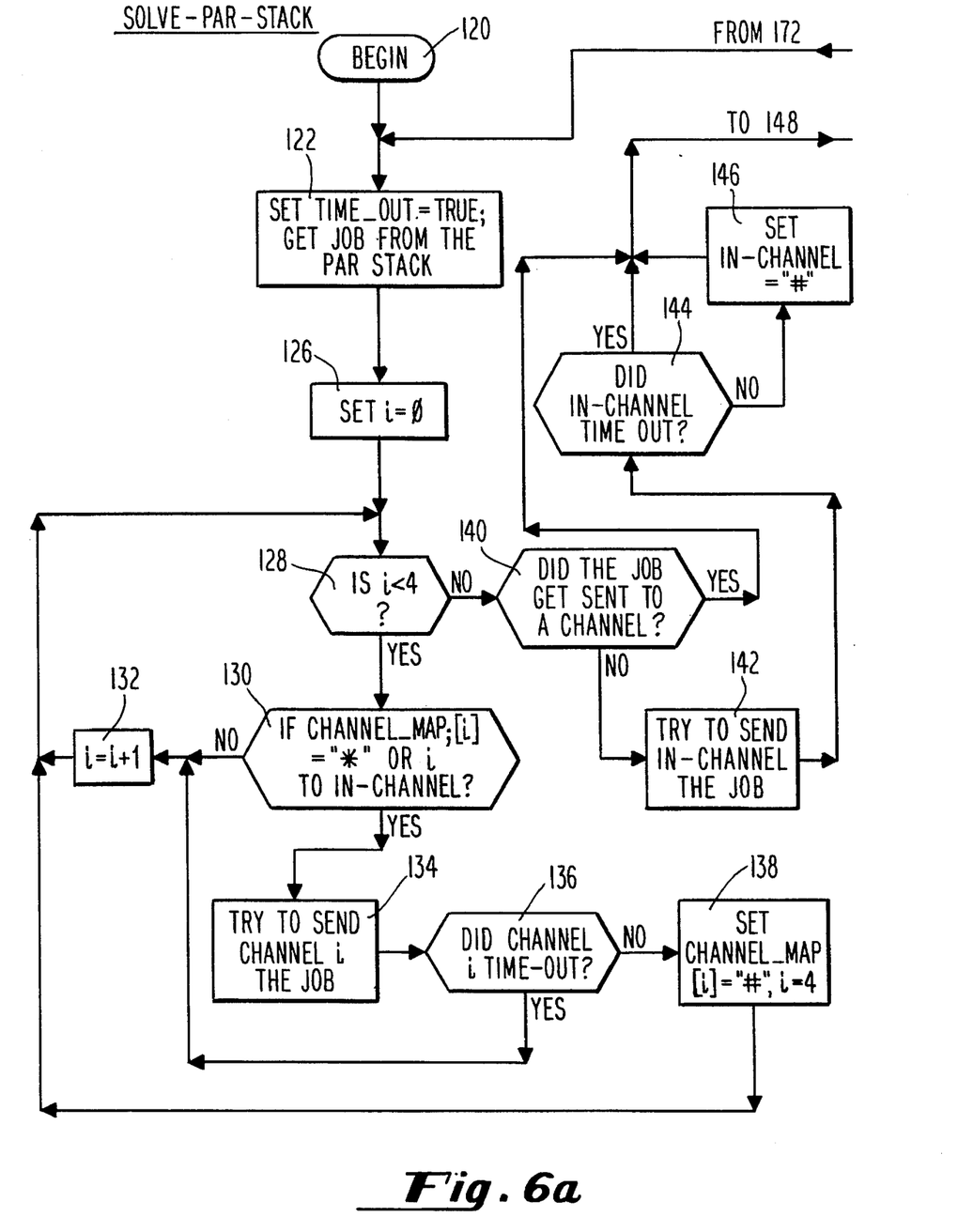
FIGS. 6a and 6b are a flow chart of the preferred method of the invention for distributing and solving parallel tasks.
Figure 6B:
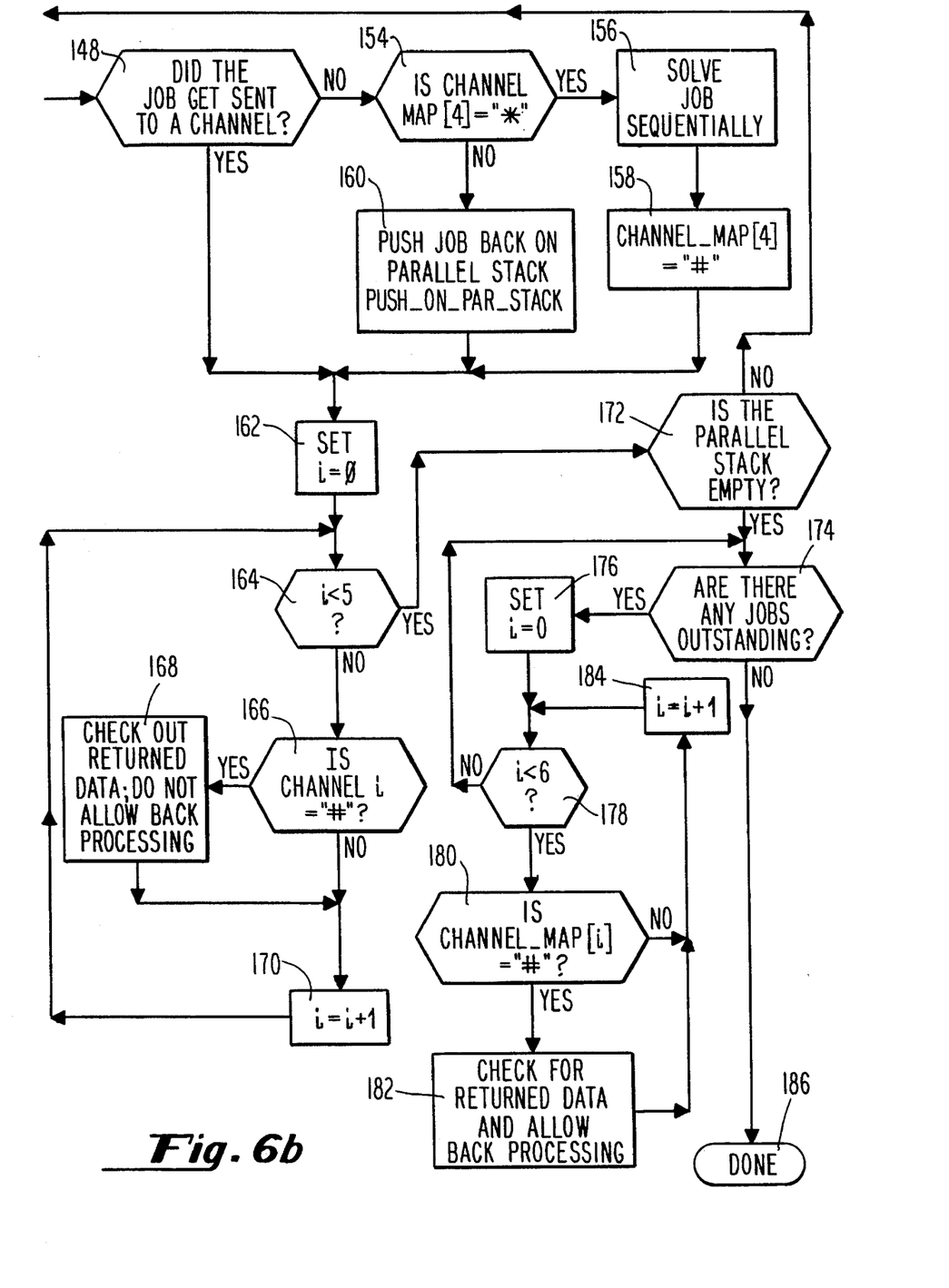

Although the flow chart of FIGS. 6a and 6b describing the process is somewhat intricate, the basic idea behind SOLVE_PAR_STACK is very simple. Given a list of tasks on the parallel stack, the object is to try to send as many tasks as possible out to other processors and those that cannot be sent out are done internally. This method makes sure that if no processors are available the parallel stack still gets solved. The majority of FIG. 6 details the preferred implementation of this mechanism for efficiency. Ideally, all parallel jobs should be sent out to other processors, but often parallel architectures (such as those based on the INMOS Transputer) have only four connections to other processors and the parallel stack may easily contain twenty or more tasks. Therefore, to be efficient, subroutine SOLVE_PAR_STACK must be able to send jobs out, collect results, send more jobs out, and at the same time solve a job or jobs internally. This concurrence can be accomplished either through some interrupt mechanism or through concurrent processes on the same processor. A further efficiency can be found by allowing the spawning processor to accept "tree restricted back processing" from a neighboring processors while waiting for results from the same or different neighboring processor. Tree restricted back processing allows the spawning processor to accept only jobs from those neighboring processors to which the spawning processor originally sent a job. This process occurs while the spawning processor is waiting for the job to return. The accepted back processing job is solved sequentially. The amount and direction of back processing is then restricted to the execution tree of the original query. This restriction is critically important because allowing back processing from any processor could cause the parallel network to behave chaotically or even interlock. The INMOS Transputer supports concurrent processes on the same processor.

Although subroutine SOLVE_PAR_STACK illustrated in FIGS. 6a and 6b is intended to solve a series of parallel tasks derived from the ROAP process of FIGS. 4 and 5, there are almost no dependencies or prior assumptions as to the origin of the parallel tasks. Therefore, subroutine SOLVE_PAR_STACK is also a general method for the efficient distribution of parallel tasks across a spawning network of computing devices.

Subroutine SOLVE_PAR_STACK uses a bookkeeping device called the channel map. The CHANNEL_MAP[] is a simple six member array of characters. Each index of the array represents the status of a processing channel. As an example, the channel assignments for an INMOS Transputer are given below. The general process, however, is not limited to the INMOS Transputer.

index

[0] Hard channel 0 connected to another transputer or null.

[1] Hard channel 1 connected to another transputer or null.

[2] Hard channel 2 connected to another transputer or null.

[3] Hard channel 3 connected to another transputer or null.

[4] Soft internal channel used for solving internal tasks.

[5] Soft internal channel used for back processing.

Once initialized, channels 0,1,2,3 can have one of the following characters in the character array.

X=No response, null or dead channel.

*=Valid channel with transputer or host on other end.

>=Valid channel with transputer or host on other end. However, this channel can only send jobs out; it cannot accept jobs from other transputers, with the exception of back processing. (For subroutine SOLVE_PAR_STACK, the ">" can be treated the same as a "*".)

=Channel is busy, a job has been sent and accepted at the other end of the channel.

Once initialized, channel 4 can have one of the following values in the character array.

*=Valid channel, can accept an internal job for processing.

=busy working on an internal job.

Once initialized, channel 5 can have one of the following values in the character array.

*=Valid channel, can accept a job for back processing.

n=Channel is busy working on a back process. The number "n" is the number of the hard channel that has sent the back process job. ("n" can equal 0,1,2, or 3)

The operation of subroutine SOLVE_PAR_STACK, as shown in FIGS. 6a and 6b, can be described as follows. Upon entering the subroutine in step 120, a flag called TIME_OUT is set to TRUE and a job is removed from the parallel stack in step 122. An attempt to send the current job to another processor over hard channels (0,1,2,3) is made. A counter "i" is set to the first channel in step 126 and in step 128 a check is made to see if "i" has reached the count of 4. If not, the channel map is checked for the index of "i" in step 130. If the channel map has a "*" entry for the channel and the channel is not the channel that sent the original query (IN_CHANNEL), an attempt is made in step 134 to send the channel the job that has been pulled from the parallel stack. The attempt to send the job is controlled by a timer. If the processor at the other end of channel "i" is busy and can not accept the job, then in step 136 the timer "times out" (flag TIME_OUT is set to TRUE) and the effort to send the job stops. Step 136 is a check of the TIME_OUT flag and if the channel has not "timed out", in step 138 a job is sent to the channel, CHANNEL_MAP[i] is set to "#", and "i" is set to equal to 4. If at step 136 the channel had "timed out" or at step 130 the channel was busy (#) or null (X), then "i" would be incremented in step 132 by one and an attempt to send the job to the next channel would be made by reentering the loop at step 128. Note that if the job is sent, "i" is set equal to 4 in step 138 so that the next pass through step 128 will shift control to step 140. For simplification of the present discussion, steps 142 and 144 will be ignored at this time. Therefore, assume all flow to step 148 comes from step 140.

Step 148 checks to see if the current job was sent out to another processor through the cycle described by steps 128, 130, 134, 136, and 132. If the job was successfully sent to another processor, then channels are checked for any returned data in the loop comprising steps 162, 164, 166, 168, and 170. If the job was not successfully sent to another processor, internal solution of parallel jobs will be accomplished sequentially, using a subroutine denominated herein as SEQ_SOLVE. Subroutine SEQ_SOLVE solves a query in sequential fashion. It desirably uses a compiled, but may use a pseudo compiled or interpreted, version of the query for solution. Step 154 is a check to see if the internal channel (4) is already working on a job. If channel 4 is busy (CHANNEL_MAP[4]="#"), then the current job is postponed and in step 160 is pushed back on the parallel stack. If the internal channel is able to accept a job (CHANNEL_MAP[4]="*") then a SEQ_SOLVE process is started, desirably concurrently. Once the SEQ_SOLVE process is started, the internal channel index is set in step 158 to "#" to indicate that it is busy and flow continues to the loop comprising steps 162-170. This feature allows other jobs on the parallel stack to be sent out and returned while the SEQ_SOLVE process is occurring. If the intended computing device cannot support concurrent processing, then this strategy may be implemented using internal interrupts or some other method of multi-tasking.

Control flow from steps 148 and 154 always ends up at step 162. In the loop which follows, a quick check is made of all busy channels for returned results in step 168. This process is straightforward except that back processing will be turned off during the check for returned data in step 168.

Once the busy channels have been checked for returned data, in step 172 a check is made to see if there are any more jobs on the parallel stack. If there are, the routine returns to step 122 and the cycle is repeated from the beginning. If in step 172 the parallel stack is empty, then the channel map is checked in step 174 for any outstanding jobs. If there are outstanding jobs, then a "check and wait" loop comprising steps 176, 178, 180, 182, and 184 is started. This loop will continue to check busy channels for returned data. In this loop, however, back processing is allowed. When in step 174 it is determined that all jobs on the parallel stack have been solved, subroutine SOLVE_PAR_STACK terminates in step 186.

Back processing in subroutine SOLVE_PAR_STACK shown in FIGS. 6a and 6b takes two forms, sending jobs out and returning data from the back processed job. Sending jobs out is performed directly in subroutine SOLVE_PAR_STACK through steps 140 and 144. When a processor receives a job from a channel, that channel is marked as the "IN_CHANNEL". If in step 140 it is determined that a job could not be sent to any other hard channel, an attempt is made in step 142 to send the job back to the IN_CHANNEL using the TIME_OUT variable. It will be understood that the processor at the other end of IN_CHANNEL is somewhere in its own SOLVE_PAR_STACK routine. If the IN_CHANNEL accepts the job (i.e. does not time out in step 144) then the character at its index in the CHANNEL_MAP map is set to "#" and the subroutine continues. Acceptance of a back processing job indicates that a processor is in the "check and wait" loop of steps 174-182.

Figure 7:
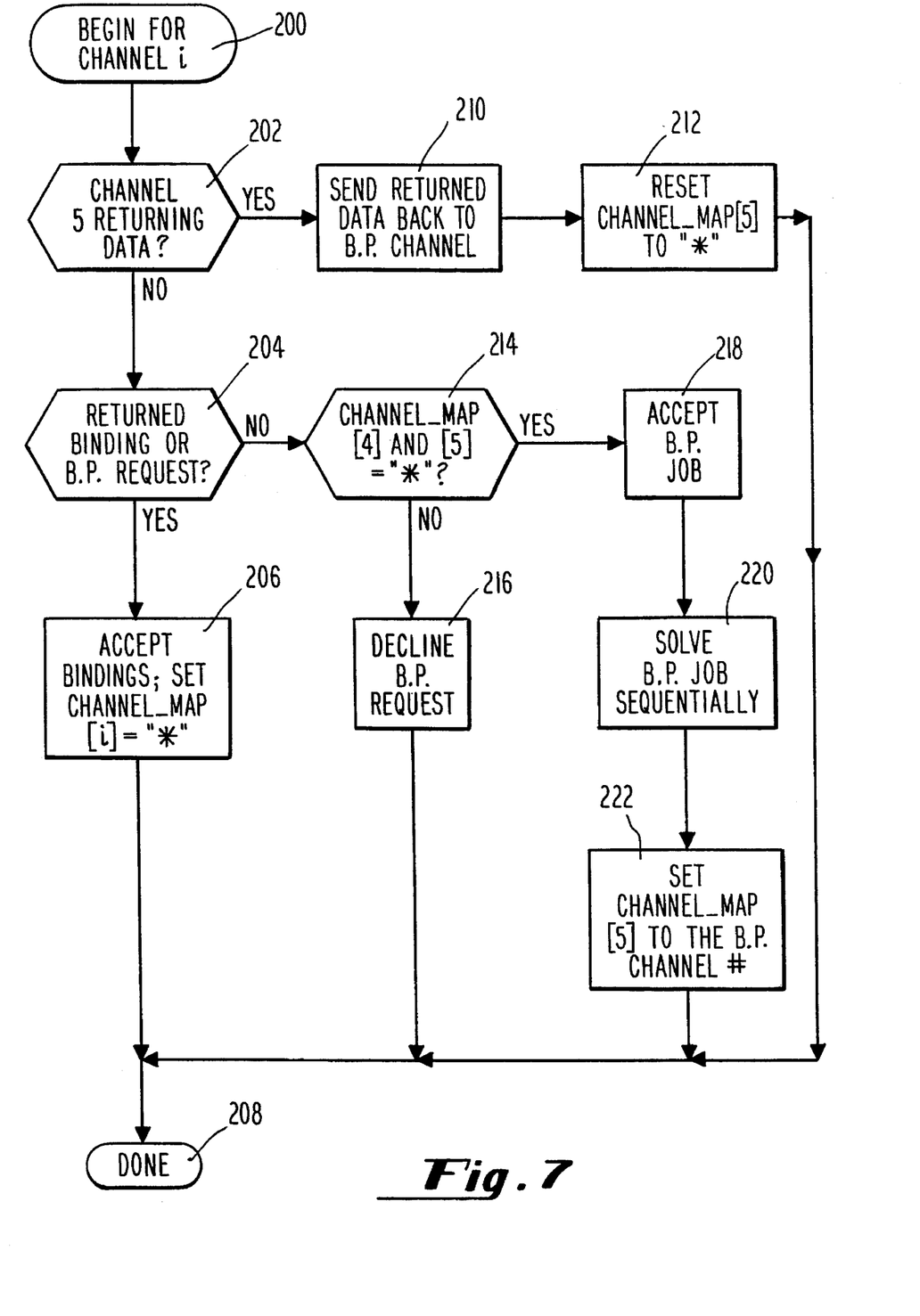
FIG. 7 is a flow chart of a method of back processing which may be used in the present invention.

FIG. 7 depicts a subroutine for checking busy channels for returned data, denominated herein as CHECK_DATA. A detailed explanation of this process is included because back processing ("B.P.") requests are accepted in this routine. The subroutine is called in step 200 for a specific channel "i" that has data to return ("i" corresponds to the index in the CHANNEL_MAP). Upon entry the subroutine checks in step 202 to see if channel 5, the internal back processing channel, is returning data. If the channel is returning data, then in step 210 the data is sent to the hard channel that requested the back processing. After the data has been returned, the internal back processing channel, CHANNEL MAP[5], is reset to "*" in step 212. If the channel 5 is not returning data, step 202 directs flow to step 204, which checks to see if the data are returned bindings or a back processing request. If bindings are being returned, then they are accepted in step 206 and CHANNEL_MAP[i] is set to "*". If the request is for back processing, in step 214 a check is made as to whether other internal jobs are in progress. If there are no other internal processes (CHANNEL_MAP[4] and CHANNEL_MAP[5] both equal "*"), the processor accepts a back processing job in step 218. The back processing job is started as a sequential process, desirably concurrently, in step 220 using SEQ_SOLVE. Once the job is started, CHANNEL_MAP[5] is set in step 222 to the channel number of the back processing channel. If there are internal jobs in progress, the back processing request is declined in step 216.

Several points can be made about the back processing mechanism. First, back processing jobs are solved sequentially. Second, back processing jobs are only accepted from channels that have been sent jobs by SOLVE_PAR_STACK. Finally, back processing can be turned off by setting CHANNEL_MAP[5] equal to something other than "*".

The system of the present invention is therefore seen to provide an efficient means for executing programs on multiprocessor networks. The network does not require any control by the programmer because the method of the invention automatically performs program analysis, distribution of parallel tasks, execution thereof, and accumulation of results. The system will operate with any network topology and with any number of processors since each processor determines, when necessary, which processors are coupled to it and available to accept tasks at that time. The method of the invention operates to identify parallel tasks and distribute any tasks identified as soon as possible. Since each processor in the network does so, a user's query is distributed in parallel tasks across the network as quickly as possible. The operation of the system is load-balanced, since allocation of parallel-executable tasks occurs automatically and dynamically and tends to maintain all available processors busy on such tasks. Such a system is easily extended; greater execution speed can usually be obtained by simply adding more processors to the network which will be utilized if available and called upon during execution of a user program. By ceasing the search for parallel tasks and distributing them as soon as any are identified, the parallelization overhead is minimized. Because the processors in the network return task execution results to the node which requested them, the system of the present invention is ideally suited to multiuser or multitasking operation. For instance, user queries presented to two different root processors will cause two different non-intersecting execution trees to be active simultaneously. Because each processor returns results to the requesting processor, no conflict can occur. A processor which completes a task in one execution tree can immediately be called upon to solve a task in another. Such dynamic automatic evolution of the execution trees is in effect a variation in effective network topology, which dramatically illustrates how the system of the invention is operable without programmer knowledge of or control over network topology. The dynamic and automatic identification and distribution of parallel tasks, because it occurs through interpreter operation and is thus effected based on the particular user program being executed and the dynamic topology of the network, is highly efficient. The system of the invention further requires no language extensions to perform the necessary functions. If the method is implemented as a PROLOG interpreter, all PROLOG user programs will be compatible without rewriting to incorporate new features.

While detailed descriptions of the preferred embodiments of the invention have been given, variations which do not depart from the spirit of the invention will no doubt occur to others skilled in the art.

What is claimed is:

1. A method of operating an arbitrary computer network to solve a logic query with respect to a logic program and distribute subqueries associated with said logic query over said network, said network comprising a plurality of nodes, each node of said plurality of nodes including a processor and local memory which is accessible by said processor in said node, and a plurality of communication channels for transmitting information between said plurality of nodes, each one of said plurality of communication channels coupling one of said plurality of nodes with at least one different node of said plurality of nodes in said network, comprising the steps of:

a. receiving said logic query with a first node of said plurality of nodes;

b. partially solving said received query on said first node to provide a received query partial solution;

c. testing said received query partial solution on said first node for OR-parallel subqueries and, if said received query partial solution includes said OR-parallel subqueries, identifying and collecting said OR-parallel subqueries on said first node which are included in said received query partial solution;

d. if said received query partial solution does not include said OR-parallel subqueries, returning to step b and continuing to solve said received query on said first node;

e. if said OR-parallel subqueries are identified in step c, determining with said first node whether a second node coupled to said first node by at least one of said plurality of communication channels is available for solution of said OR-parallel subqueries without waiting for a subquery request from the second node;

f. if said OR-parallel subqueries are identified in step c and said second node is determined to be available in step e, transmitting at least one of said identified OR-parallel subqueries from said first node to said second node coupled to said first node; and g. if said OR-parallel subqueries are identified in step c and no second node is determined to be available in step e, sequentially solving on said first node said OR-parallel subqueries identified in step c; wherein steps a–g are performed only at run-time, and wherein steps b–d are repeated until said received query has been solved without identification of said OR-parallel subqueries or said OR-parallel subqueries have been identified in said received query partial solution.

2. The method of claim 1, further comprising the step of performing, at each node in said network receiving a logic query or subquery, the steps of a–g set forth with respect to said first node.

3. The method of claim 2, further comprising the steps of executing each transmitted subquery to provide subquery execution results and transmitting each subquery execution result to the node which transmitted the subquery giving rise to such result.

4. The method of claim 1, further comprising the step, if the partial solution is only one subquery having multiple terms, of checking the subquery for AND-parallelism.

5. The method of claim 4, wherein said AND-parallelism checking step includes checking each term in the subquery sequentially from left to right at run time to determine whether unbound variables of the term being checked are shared with other terms in the subquery.

6. The method of claim 5, further comprising the step, if the previously checked terms of the subquery are determined to share unbound variables with the next term in the subquery, of solving the previously checked terms of the subquery.

7. The method of claim 6, wherein said previously checked term solving step includes solving each previously checked term in the subquery as a separate subquery by transmitting the term as a subquery to an available coupled node if a coupled node is available and by solving the term sequentially if no coupled node is available.

8. The method of claim 7, further comprising the step, if said previously checked term solving step results in multiple bindings for previously checked terms, of generating and solving OR-parallel queries based on each possible combination of bindings for each unchecked term in the subquery.

9. The method of claim 5, further comprising the step of determining if the remaining unchecked terms of the subquery contains at least a predetermined number of unbound variables which appear in previous checked terms of the subquery and, if so, solving the previously checked terms of the subquery.

10. A computer implemented method of executing a logic program comprising the steps of:

a. providing an arbitrary computing network which includes a plurality of nodes, each node having a node processor and each node being coupled to at least one other node in said network by a communication channel for transmission of parallel-executable tasks and task execution results between coupled nodes;

b. executing on a node processor in a first of said plurality of nodes a first portion of said logic program to provide a partial execution result;

c. identifying with said node processor in said first node, only at run time, based on said partial execution result, tasks comprising said logic program which may be executed in parallel;

d. if said tasks which may be executed in parallel are identified in step c, determining with said first node whether a second node coupled to said first node by a communication channel is available for solution of said tasks which may be executed in parallel without waiting for a task request from the second node;

e. if said tasks which may be executed in parallel are identified in step c and said second node is determined to be available in step d, transmitting at least one of said identified tasks from said first node to said second node in said network;

f. if said at least one of said identified tasks is transmitted in step e, causing a node processor in said second node to execute said tasks transmitted in step e to provide parallel execution results; and g. if said tasks which may be executed in parallel are identified in step c and no second node is determined to be available in step d, sequentially solving on said processor of said first node said tasks which may be executed in parallel identified in step c.

11. A computer network for solving a logic query with respect to a logic program and distributing subqueries associated with said logic query over said network, comprising:
   a. a plurality of nodes including first and second nodes, each node of said plurality of nodes including a processor and local memory which is accessible by said processor in said node;
   b. a plurality of communication channels for transmitting information between said plurality of nodes, each one of said plurality of communication channels coupling one of said plurality of nodes with at least one different node of said plurality of nodes in said network;
   c. said first node including:
      i. means receiving said logic query;
      ii. means for partially solving said received query to provide a received query partial solution;
      iii. means for testing said received query partial solution for OR-parallel subqueries;
      iv. means, responsive to said means for testing, for identifying and collecting said OR-parallel subqueries which are included in said received query partial solution if said received query partial solution includes said OR-parallel subqueries without waiting for an OR-parallel subquery request from the second node;
      v. means, responsive to said means for testing, for continuing to solve said received query if said received query partial solution does not include said OR-parallel subqueries;
      vi. means, responsive to said means for testing, for determining whether a second node coupled to said first node by at least one of said communication channels is available for solution of said OR-parallel subqueries;
      vii. means, responsive to said means for determining, for transmitting at least one of said identified OR-parallel subqueries from said first node to said second node if said OR-parallel subqueries are identified by said means for testing and said second node is determined to be available; and
      viii. means, responsive to said means for determining, for sequentially solving on said first node said OR-parallel subqueries if said OR-parallel subqueries are identified by said means for testing and no second node is determined to be available;
   wherein said computer network solves said logic query only at run-time, and wherein said means for partially solving said received query continues to solve said received query until said received query has been solved without identification of said OR-parallel subqueries or said OR-parallel subqueries have been identified in said received query partial solution.

12. The computing network of claim 11, wherein said means for sequentially solving includes an interpreted, pseudo compiled, or compiled subroutine.

13. The computing network of claim 12, wherein each node of said plurality of nodes includes means for checking a multiple termed subquery for AND-parallelism.

14. The computing network of claim 13, wherein said AND-parallelism checking means includes means for sequentially checking from left to right each term of said multiple termed subquery to determine whether variables of said term being checked are shared with terms in remaining unchecked terms of said subquery.

15. The computing network of claim 14, wherein each node of said plurality of nodes includes means for solving said previously checked terms as subqueries if a term of said multiple termed subquery being checked shares a variable with an unchecked term of said subquery.

16. The computing network of claim 15, wherein said means for solving said previously checked terms as subqueries includes means for determining whether a coupled node is available for solution of a term and if said coupled node is available, transmiting a previously checked term as a subquery to said available coupled node, and if no coupled node is available, sequentially solving said previously checked terms as subqueries.

17. The computing network of claim 16, wherein each node of said plurality of nodes includes means, operable upon an occurrence of multiple bindings in a solution of previously checked terms, for generating and solving OR-parallel queries based on each possible combination of bindings for each unchecked term in said subquery.

18. The computing network in claim 14, wherein each node of said plurality of nodes includes means for determining if said unchecked terms of said subquery contain at least a predetermined number of unbound variables which appear in previously checked terms of said subquery.

19. A computer network for executing a logic program, comprising:
   a. a plurality of nodes including first and second nodes, each node of said plurality of nodes including a processor and local memory which is accessible by said processor in said node;
   b. a plurality of communication channels for transmitting information between said plurality of nodes, each one of said plurality of communication channels coupling one of said plurality of nodes with at least one different node of said plurality of nodes in said network;
   c. means for executing on a node processor in a first of said plurality of nodes a first portion of said logic program to provide a partial execution result;
   d. said node processor on said first node including:
      i. means for identifying only at run time, based on said partial execution result, tasks comprising said logic program which may be executed in parallel;
      ii. means, responsive to said means for identifying, for determining whether a second node coupled to said first node by a communication channel is available for solution of said tasks which may be executed in parallel without waiting for a task request from the second node if said tasks which may be executed in parallel are identified by said means for identifying;
      iii. means, responsive to said means for determining, for transmitting at least one of said identified tasks from said first node to said second node in said network if said tasks which may be executed in parallel are identified by said means for identifying and said second node is determined to be available by said means for determining;
      iv. means, responsive to said means for determining, for sequentially solving said tasks which may be executed in parallel identified by said means for identifying if said tasks which may be executed in parallel are identified by said means for identifying and no second node is determined to be available by said means for determining; and
   e. means for causing a node processor in said second node to execute said tasks transmitted by said means for transmitting to provide parallel execution results.

* * * * *